(12) United States Patent
Rubaldo et al.

(10) Patent No.: US 9,354,112 B2
(45) Date of Patent: May 31, 2016

(54) DETECTION CIRCUIT INCLUDING A NOISE REDUCING MODULE HAVING A SWITCH CONNECTED BETWEEN A PHOTODIODE AND AN INTEGRATING CIRCUIT

(75) Inventors: Laurent Rubaldo, Fontaine (FR); Nicolas Ricard, Coublevie (FR)

(73) Assignee: SOCIETE FRANCAISE DE DETECTEURS INFRAROUGES—SOFRADIR, Chatenay Malabry (FR)

( * ) Notice: Subject to any disclaimer, the term of this patent is extended or adjusted under 35 U.S.C. 154(b) by 73 days.

(21) Appl. No.: 14/360,038

(22) PCT Filed: Nov. 22, 2011

(86) PCT No.: PCT/FR2011/000613
§ 371 (c)(1),
(2), (4) Date: May 22, 2014

(87) PCT Pub. No.: WO2013/076379
PCT Pub. Date: May 30, 2013

(65) Prior Publication Data
US 2015/0233759 A1    Aug. 20, 2015

(51) Int. Cl.
*H04N 5/357*    (2011.01)
*G01J 1/44*    (2006.01)

(52) U.S. Cl.
CPC .......................................... *G01J 1/44* (2013.01)

(58) Field of Classification Search
CPC ..... G01J 1/44; H01L 27/1462; H01L 27/308; H01L 25/167; H04N 5/357
USPC ..... 250/214 R, 214.1, 221, 214 LS; 327/514, 327/515; 348/294–311; 257/290–292, 257/440–444
See application file for complete search history.

(56) References Cited

U.S. PATENT DOCUMENTS 9,116,040 B2 *  8/2015  Maltere ..................... G01J 1/18

FOREIGN PATENT DOCUMENTS

EP    2 178 288 A1    4/2010
EP    2 302 341 A2    3/2011

OTHER PUBLICATIONS

Zanolla et al., "Reduction of RTS Noise in Small-Area MOSFETs Under Switched Bias Conditions and Forward Substrate Bias," *IEEE Transactions on Electron Devices*, May 2010, vol. 27, No. 5, pp. 1119-1128.
Jul. 26, 2012 International Search Report issued in International Application No. PCT/FR2011/000613.

* cited by examiner

*Primary Examiner* — Que T Le
(74) *Attorney, Agent, or Firm* — Oliff PLC

(57) ABSTRACT

The detection circuit comprises a switch connected between a photodiode and an integrator. It further comprises means for alternately switching bias conditions of the photodiode between a reverse bias and another state. The electronic traps in the photodiode are regularly passivated during the other state.

7 Claims, 3 Drawing Sheets

DETECTION CIRCUIT INCLUDING A NOISE REDUCING MODULE HAVING A SWITCH CONNECTED BETWEEN A PHOTODIODE AND AN INTEGRATING CIRCUIT

TECHNICAL FIELD OF THE INVENTION

The invention concerns a detection circuit including a switch connected between a photodiode and an integrating circuit.

The invention also concerns a method for operating such detection circuit.

STATE OF THE ART

As illustrated in FIG. 1, in conventional detection circuits, a photodiode 1, reversely biased, outputs a current representative of a scene observed. The photodiode 1 outputs this current, for a predefined duration, to a readout module 2 which includes an integrating device 3.

The readout module 2 comprises an injection transistor 4 connected to the integrating device 3. An injection potential $V_{BIAS}$ is applied to the gate electrode of the injection transistor 4 and is used to bias the photodiode 1. Such a circuit is commonly called a 'direct injection circuit'.

The current provided by the photodiode 1 is processed by the readout circuit 2 in order to provide a bit of information about the scene observed.

Theoretically, the current provided is proportional to the light intensity of the scene observed. However, the detection circuit is not perfect and a noise component exists inside each element of the detection circuit. There is especially a low frequency noise component whose influence can be visually observed for the signal emitted by the readout circuit.

Even though significant progress has been achieved with respect to readout module and circuits for processing this information, there is still a random and discontinued parasitic current from the photodiode which modifies the current value, normally expected, for the scene observed. This current modification is particularly troublesome when the detection circuit uses low intensity currents. The current modification distorts for example the value representative of black, which can modify the ulterior analysis of the scene observed. In order to address these concerns, different approaches have been proposed using means for quantifying the parasitic current and/or means for subtracting the parasitic current.

As a consequence, circuits have been provided with additional correction blocks which present numerous problems of integration when one strives for circuits having a reduced size and/or circuits having a controlled electrical power consumption.

OBJECT OF THE INVENTION

The object of the invention is a detection circuit easy to implement and reducing the noise influence on the photodiode in the detection circuit.

The device according to the invention is characterized in that it comprises
 a switch,
 a photodiode connected to a first main terminal of the switch,
 an integrator connected to a second main terminal of the switch,
 means for alternately switching the bias of the photodiode between a reverse bias and another state, the switch being configured so as to be in the blocking state when the photodiode is in the other state.

Another object of the invention is a method of operation which is easy to implement while reducing in a reliable and repeatable way the noise in the photodiode.

The method of operation according the invention is characterized in that it comprises:
 providing a detection circuit using a switch connected between a photodiode and an integrator,
 during a first period of an acquisition phase, applying a first bias condition to the terminals of the photodiode for reversely biasing the photodiode and
 during a second period of the acquisition phase, applying a second bias condition for setting the photodiode in another state, the switch being configured so as to be in a conducting state during the first period and in a blocking state during the second period, the alternation between the first and second periods being carried out at a frequency superior to 10 Hz.

BRIEF DESCRIPTION OF THE DRAWINGS

Other advantages and features will become more evident from the following description of particular embodiments of the invention given as non-restrictive examples and represented in the annexed drawings in which.

DESCRIPTION OF A PREFERENTIAL EMBODIMENT OF THE INVENTION

As illustrated in FIGS. 2 to 5, the detection circuit comprises a photodiode 1 connected to a readout circuit 2. The readout circuit comprises an integrator 3 storing the charges coming from the photodiode 1. The readout circuit 2 converts a current signal into a voltage signal. The integrator device 3 comprises an integration capacitor $C_{INT}$. Advantageously, the photodiode 1 detects an infrared radiation.

The photodiode is advantageously made in a Type III-V substrate, for example, InP, GaAS, GaAlAs, or a type II-VI substrate for example HgCdTe.

According to the embodiments, the integrator 3 can be for example a direct injection device, a buffered direct injection device, a device of the type capacitive transimpedance amplifier or a simple integration capacitor $C_{INT}$. Advantageously, the integrator 3 comprises means for resetting the charges stored in the integration capacitor $C_{INT}$.

In a particular embodiment, the detection circuit comprises a switching circuit for the bias of the photodiode 1 between a reverse bias and another state, for example a forward bias or an open circuit state leading to a floating potential.

During a first period when the photodiode 1 is reversely biased, the light radiation received is converted into an electric signal and the conversion ratio is defined in a stable or substantially stable way by means of the bias conditions applied.

It has been found that, when the photodiode 1 is forward biased or in a floating state during a second period, the recombination is favored and the traps are recombined. In this way, the photodiode 1 delivers a lesser quantity of parasitic carriers which are not representative of the scene observed. The photodiode 1 is then close to its ideal characteristics.

As the bias conditions of the photodiode are modified, the conversion ratio of the light signal into an electric signal is also modified and it is advantageous to block the signal emitted by the photodiode 1 when the latter is in a different state, i.e. out of its reverse bias state. In this way, another parasitic signal is prevented from being stored in the integrator.

Figure 1:
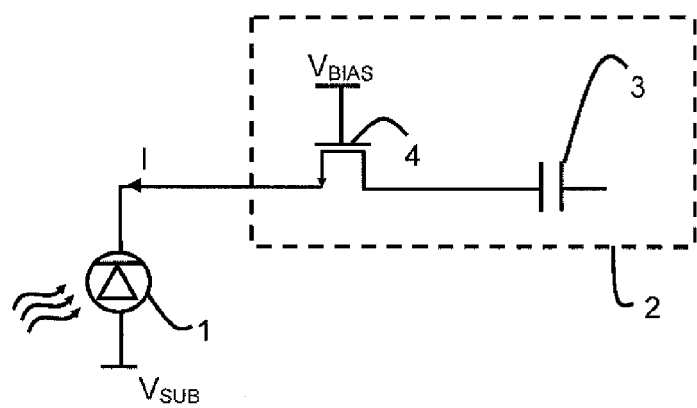
FIG. 1 schematically represents a direct-injection detection circuit according to the prior art, FIGS. 2 to 5 schematically represent various embodiments of a detection circuit including a module for reducing the noise in the photodiode.
Figure 2:
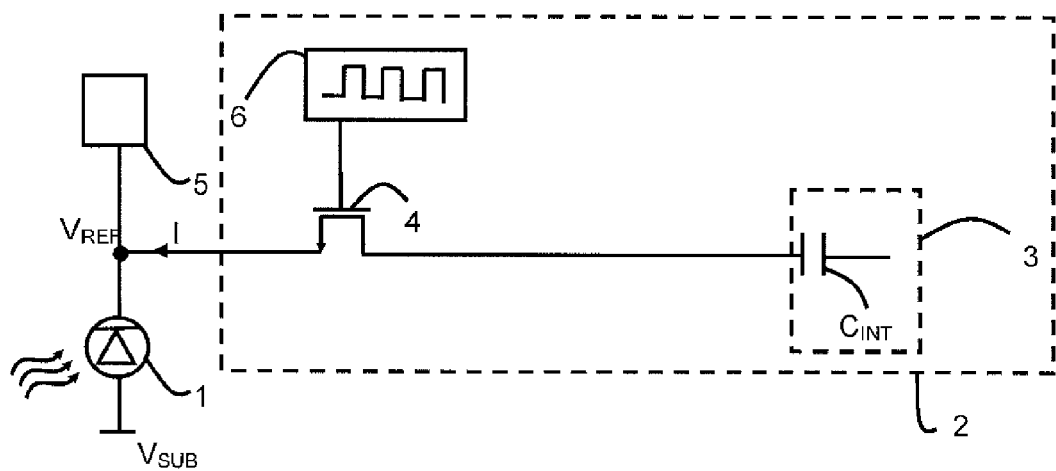
Figure 3:
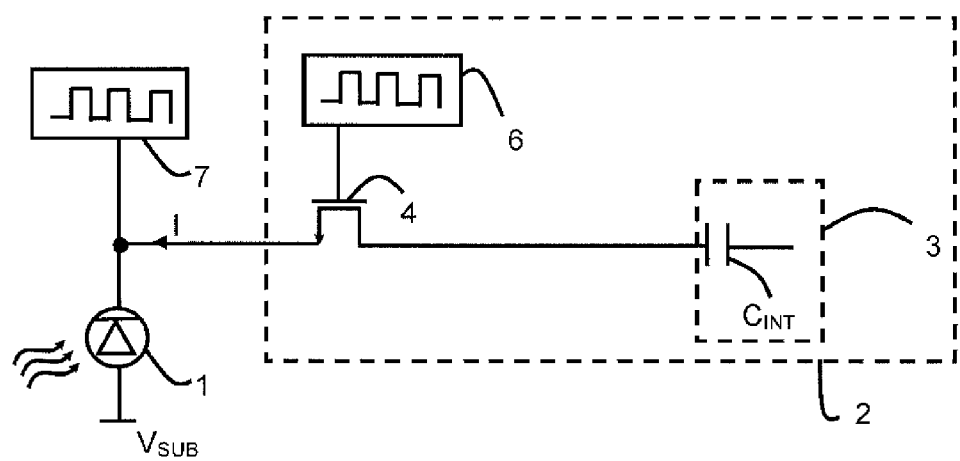

During the effective acquisition of the charges, the photodiode 1 is reversely biased. A first terminal of the photodiode 1 is submitted to the bias $V_{SUB}$ provided for example from the substrate. In the embodiment of FIG. 2, the second terminal of the photodiode 1 is connected to biasing means 5 imposing a reference voltage $V_{REF}$. In this way, the photodiode 1 is biased between the voltages $V_{REF}$ and $V_{SUB}$ imposed to each terminal of the photodiode 1. It is then possible to modulate the supply conditions for the photodiode by modifying the voltage applied by the substrate or by the biasing circuit 5 or both. In the embodiment illustrated in FIG. 2, the circuit 5 can be used as a switching circuit for biasing the photodiode. The potential source applying the potential $V_{SUB}$ can also be used as a switching circuit for biasing the photodiode.

A switch 4, for example an injection transistor in the illustrated embodiment, is connected between the photodiode 1 and the integrator 3. The injection transistor 4 comprises a first main terminal, for example a source/drain electrode, connected to the photodiode 1. A second main terminal of the injection transistor 4, for example another source/drain electrode, is connected to the integrator 3.

The switch 4 is configured so as to be in the conducting state when the photodiode is reversely biased and in the blocking state when the photodiode is in another state. In this way, the switch 4, through which the signal normally flows from the photodiode 1 towards of the readout circuit 3 can block the passage of the signal if the bias conditions for the photodiode 1 are not those for a reliable acquisition.

The detection circuit can comprise means 5 for applying an alternating voltage to the control electrode of the switch 4. This alternating voltage is selected so as to cause the switch 4 to switch between its blocking and conducting states. In the case of an injection transistor 4, the switching operation is advantageously carried out in its conduction channel between an inversion mode and a different state, i.e. an enhancement or depletion mode. Therefore, the injection transistor 4 alternately works in an inversion mode and in an enhancement/depletion mode in and around its conduction channel.

During the first period, a first voltage is applied to the control electrode, which allows to put the switch in the conducting state. During the first period, the passage of the carriers between the photodiode 1 and the integrator 3 is possible and the electric charges are stored in the integrator 3. The first voltage is configured so as to put the conduction channel of the transistor in an inversion mode. During the second period, a second voltage is applied to the control electrode of the switch. This second voltage allows to block the passage of the current between the photodiode 1 and the integrator 3. The second voltage is configured so as to put the conduction channel of the transistor in an enhancement mode or a depletion mode.

The inversion mode is obtained when the voltage $V_{GS}$ between the gate electrode and the source electrode is superior or equal to the threshold voltage $V_{th}$ of the nMOS transistor. The other (depletion or enhancement) state is obtained when the voltage $V_{GS}$ between the gate electrode and the source electrode is inferior to the threshold voltage $V_{th}$ of the nMOS transistor. For example, the enhancement or depletion mode is obtained when the voltage $V_{GS}$ is negative for a nMOS transistor.

The inversion mode is obtained when the voltage $V_{GS}$ between the gate electrode and the source electrode is inferior or equal to the threshold voltage $V_{th}$ of the pMOS transistor. The other (depletion or accumulation) state is obtained when the voltage $V_{GS}$ between the gate electrode and the source electrode is superior to the threshold voltage $V_{th}$ of the pMOS transistor. For example, the enhancement mode is obtained when the voltage $V_{GS}$ is positive for a pMOS transistor.

The signal applied to the gate electrode allows the voltage $V_{GS}$ (the voltage difference between the gate and the source) to switch from one side of the threshold voltage of the transistor to the other, for example between positive values and negative values. The switching operation of the transistor between the blocking and conducting states occurs when the voltage $V_{GS}$ is equal to the threshold voltage of the transistor.

The signal applied to the control electrode of the injection transistor forming the switch 4 can be the potential $V_{SUB}$ applied to the substrate if the potential $V_{SUB}$ is used to modify the bias conditions for the photodiode 1.

The signal applied to the control electrode of the injection transistor can also be the potential $V_{REF}$ if the latter is used to modify the bias conditions for the photodiode.

It is also possible to use another signal which is then synchronized with the potential used to modify the bias conditions for the photodiode 1.

In a preferential way, a switching frequency between two states of the photodiode, superior or equal to 10 Hz, is used, which allows to limit the quantity of parasitic charge carriers introduced into the measuring circuit 2. In a still more preferential way, a switching frequency, superior to 500 Hz, has given very good results. In an also preferential way, the switching frequency is inferior to 50 kHz in order to have an efficient passivation of the traps.

The duty cycle between the other state and the reverse bias of the photodiode 1 is comprised between 5% and 50%, which allows to limit the influence of the non-acquisition phase on the operating frequency of the circuit while maintaining a major impact on the reduction of the parasitic current due to the passivation of the traps. The effective non-acquisition mode thus represents between 5% and 50% of each period of operation. Consequently, between 5% and 50% of the period is not used for storing charges into the integration capacitor. In a preferential embodiment, the total integration duration for the acquisition periods is adjusted in order to take the effective non-acquisition duration into account, i.e. the duration during which the charges are not collected.

During the effective acquisition of charges, the photodiode is reversely biased. A first terminal of the photodiode 1 is submitted to the bias $V_{SUB}$. In the embodiment of FIG. 2, the second terminal of the photodiode 1 is linked to the bias circuit 5 which imposes a reference voltage $V_{REF}$, which is here variable. In this way, the photodiode 1 is biased between the voltages $V_{REF}$ and $V_{SUB}$ imposed to each terminal of the photodiode 1.

Figure 4:
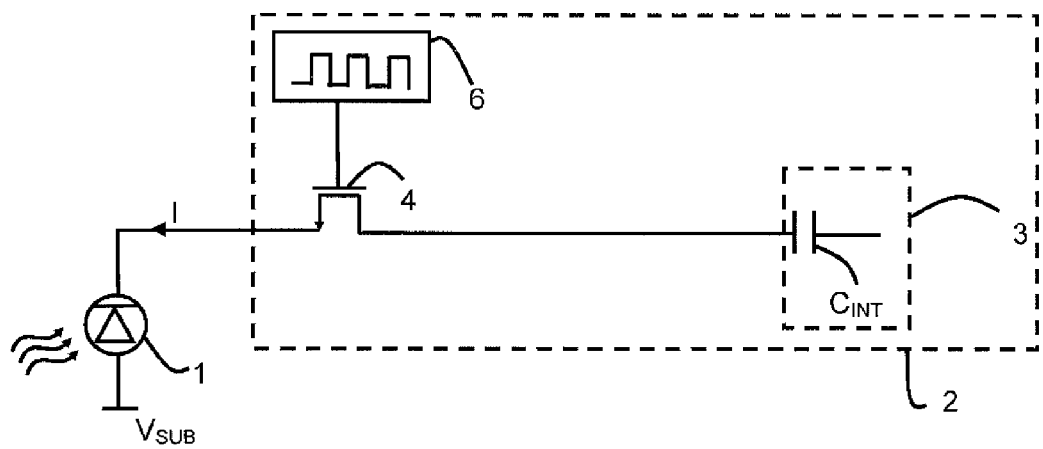

In a particular mode of operation illustrated in FIG. 4, the readout circuit 2 is configured so as to apply a bias voltage, for example the voltage $V_{REF}$, to its input terminal.

As the input terminal of the readout circuit 2 is coupled to the photodiode 1 via the switch 4, the bias of the photodiode is applied in part by the readout circuit. It is then advantageous to switch the states of the photodiode by switching the state of the switch 4.

The photodiode 1 is forward biased or unbiased when the transistor 4 is in an enhancement/depletion mode, therefore in a blocking state, which prevents a current from flowing between the integrator 3 and the photodiode 1. This embodiment is particularly compact as one of the bias voltages is applied by the readout circuit and the state switching is carried out by the injection transistor. This embodiment allows to reduce the number of lines to be integrated in a readout circuit associated with a photodiode.

In this configuration, the photodiode 1 is reversely biased when the transistor 4 is in an inversion mode, which allows the current to flow towards the integrator 3 as above. The photodiode 1 is forward biased or in a floating state when the transistor 4 is in an enhancement or depletion mode. The state switching operations are carried out simultaneously for the photodiode 1 and for the injection transistor 4, they have the same duty cycle. This embodiment avoids any problem of desynchronization and delay linked to the use of different lines for carrying signals.

In a particular embodiment illustrated in FIG. 4, the injection transistor 4 biases the photodiode 1 by means of the potential applied to its control electrode. The modification of the bias of the control electrode results in the modification of the bias conditions for the photodiode 1. The detection circuit is similar to a direct injection circuit having a variable bias applied to the gate electrode of the injection transistor 4 when the integrator 3 is formed by an integration capacitor $C_{INT}$. In this particular architecture, the injection transistor 4 associated with the alternating potential applied to its gate electrode causes the photodiode 1 to switch between a reverse bias and a floating state. This embodiment is particularly advantageous in that it is extremely compact.

Figure 5:
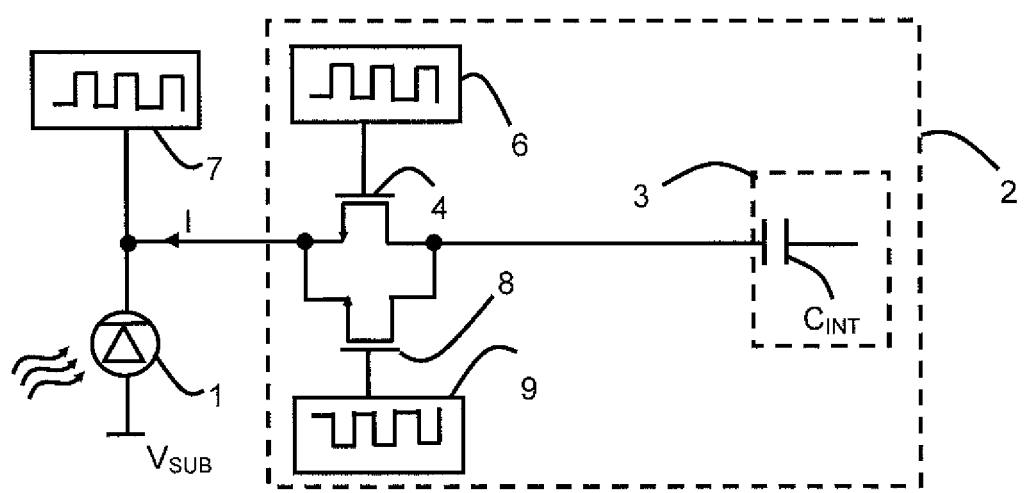

In another embodiment illustrated in FIG. 5, the detection circuit has an additional switch 8 connected in parallel to the terminals of the switch 4. In this way, the additional switch 8 is connected between the photodiode 1 and the integrator 3. In a preferential way, the switches 4 and 8 are perfectly identical transistors in order to reduce the injection problems towards the integrator.

The detection circuit further comprises an additional circuit 9 for applying an alternating voltage to the control electrode of the additional switch 8. This alternating voltage leads to the switching of the additional switch between a conducting state and a blocking state. The switching conditions between the conducting and blocking states of the additional switch 8 can be expressed in the same way as for the switch 4 by means of the sign and the amplitude of the signal $V_{GS}$ between its gate and its source electrode for a field effect transistor.

In this way, during a first period, a first additional voltage is applied to the control electrode, which allows to put the additional switch 8 in the conducting state. The passage of the carriers between the photodiode 1 and the integrator 3 is possible via this transistor. During a second period, a second additional voltage is applied to the control electrode of the additional switch. This second additional voltage allows to block the passage of the current between the photodiode 1 and the integrator 3 through this switch 8. The second additional voltage switches the additional transistor 8 into an enhancement/depletion mode.

The additional circuit 9 for applying an alternating voltage is advantageously phase-shifted with respect to the circuit 6 for applying an alternating voltage to the control electrode of the switch 4. This phase shift allows to have during a determined period one of the switches in the conducting state and the other transistor in the blocking state. In this way, it is possible to obtain a decorrelation between the switching of the switch 4 or the switch 8 and the switching of the photodiode 1. The first acquisition period is then divided into two portions, each portion being associated with the conducting state of at least one of the switches, for example a first portion for the switch 4 in the conducting state and a second portion for the switch 8 in the conducting state.

Advantageously, the transistors 4 and 8 are configured so that the bias conditions at the terminals of the photodiode are identical depending on which of the transistor 4 or the transistor 8 is used for the passage of the signal towards the readout circuit 2.

This architecture can be used if the bias of the photodiode 1 is imposed by the biasing circuit 5 in FIG. 2 or via the readout circuit and more precisely the injection transistor 4 as it is illustrated in FIG. 4.

In another particular embodiment, the photodiode 1 is biased by means of the injection transistor 4 and the additional transistor 8. These two transistors successively impose different bias conditions to the photodiode when they are in the conducting state.

When the transistors 4 and 8 are phase-shifted, the photodiode 1 is in a floating state or forward biased when the two transistors are blocked.

Thus, in a first portion of the first period, one of the two transistors is in a conducting state and the other in a blocking state, so that the photodiode is reversely biased. In a second portion of the first period, the two transistors are in a conducting state or they switch together, so that the photodiode remains reversely biased. During the second period, the two transistors are in a blocking state and the photodiode is forward biased or in a floating state. The circuit then returns into the conditions in the first period. The photodiode is therefore passivated during the second period.

The reduction of the low-frequency-type noise or RTS noise allows to obtain detection devices having a better signal-to-noise ratio. It also allows to increase the operating temperature of the detection circuit insofar as this type of parasitic noise is thermally activated in order to maintain a given signal-to-noise ratio. This increase in operating temperature is particularly advantageous in the infrared field when the detection circuit is associated with cooling means which can then be reduced or eliminated. This point is particularly advantageous in the case of detection circuits including photodiodes made on type II-VI substrates.

The readout circuit allows, during the integration phase, to reduce even eliminate the low frequency component of the parasitic noise.

After a resetting step during which the integration capacitor $C_{INT}$ is reset, the signal from of the photodiode is stored in the integration capacitor $C_{INT}$. During this acquisition phase, a variable bias is applied to a control electrode of the injection transistor 4 so as to obtain the alternating switching of its conduction band between an inversion mode and a different state. There is then a regular recombination of the defects of the conduction band during the acquisition phase. Once the acquisition is performed, the signal is then processed and the integration capacitor is emptied.

The invention claimed is:
1. Detection circuit comprising:
a switch,
a photodiode connected to a first main terminal of the switch,
an integrator connected to a second main terminal of the switch and arranged so as to receive the signal emitted by the photodiode,
an alternating switching circuit configured for reverse biasing the photodiode during a first period and for biasing the photodiode in an other state during a second period, wherein the switch is configured so as to be in a blocking state when the photodiode is in the other state.

2. Circuit according to claim 1, comprising a readout circuit including the integrator, the readout circuit being configured so as to apply a bias voltage to one of the terminals of the photodiode via the switch and wherein the alternating switching circuit is configured for applying a voltage to a control electrode of the switch so that the switch is alternately in the blocking state and a conducting state.

3. Circuit according to claim 2, wherein the alternating switching circuit is configured for applying the bias voltage to a control electrode of an injection transistor forming said switch, the injection transistor being arranged so as to form a direct injection circuit.

4. Circuit according to claim 1, further comprising:
an additional switch connected in parallel to the terminals of the switch and
an additional circuit configured for applying an alternating voltage to a control electrode of the additional switch so as to cause the additional switch switching between a blocking state and a conducting state.

5. Method for operating comprising:
providing the detection circuit wherein a photodiode is connected to an integrator by means of a switch,
applying a first bias condition to the photodiode in order to reversely bias the photodiode during a first period and
applying a second bias condition to the photodiode in order to put the photodiode into an other state different from the reversely bias state during a second period,
wherein the switch is configured so as to be in a conducting state during the first period and in a blocking state during the second period,
wherein alternation between the first and second periods being carried out at a frequency superior to 10 Hz.

6. Method according to claim 5, wherein:
the integrator is configured so as to apply a bias potential to one electrode of the photodiode,
a first voltage is applied to a control electrode of the switch so that the switch is in a conducting state and allows the passage of charge carriers between the photodiode and the integrator during the first period, and
a second voltage is applied to the control electrode of the switch so that the switch is in a blocking state and puts one electrode of the photodiode in a floating state during the second period.

7. Method according to claim 5, wherein
an additional switch is connected in parallel to the terminals of the switch and
during a first portion of the first period, a first additional voltage is applied to a control electrode of the additional switch so as to put the additional switch into a conducting state and
during a second portion of the first period a second additional voltage is applied to the control electrode so as to block the passage of the current and to put the additional switch in the blocking state.

* * * * *